United States Patent [19]
Talluri et al.

[11] Patent Number: 5,961,606
[45] Date of Patent: Oct. 5, 1999

[54] SYSTEM AND METHOD FOR REMOTE BUFFER ALLOCATION IN EXPORTED MEMORY SEGMENTS AND MESSAGE PASSING BETWEEN NETWORK NODES

[75] Inventors: Madhusudhan Talluri, Fremont; Marshall C. Pease, Mountain View, both of Calif.

[73] Assignee: Sun Microsystems, Inc., Palo Alto, Calif.

[21] Appl. No.: 08/885,056

[22] Filed: Jun. 30, 1997

[51] Int. Cl.$^6$ .............................. H04L 12/00; G06F 15/17
[52] U.S. Cl. ......................... 709/234; 709/228; 711/173; 710/56
[58] Field of Search .................. 395/200.46, 200.58, 395/200.64, 200.8, 876; 711/170, 171, 173; 709/216, 228, 234, 250; 710/56

[56] References Cited

U.S. PATENT DOCUMENTS

| | | | |
|---|---|---|---|
| 4,467,411 | 8/1984 | Fry et al. | 364/200 |
| 4,603,382 | 7/1986 | Cole et al. | 364/200 |
| 4,888,727 | 12/1989 | Getson, Jr. et al. | 364/900 |
| 4,956,771 | 9/1990 | Neustaedter | 364/200 |
| 5,289,470 | 2/1994 | Chang et al. | 370/94.1 |
| 5,555,380 | 9/1996 | Suzuki | 395/250 |
| 5,602,995 | 2/1997 | Hendel et al. | 395/250 |
| 5,682,553 | 10/1997 | Osborne | 395/876 |
| 5,758,191 | 5/1998 | Kasebayashi et al. | 395/876 |
| 5,781,801 | 7/1998 | Flanagan et al. | 395/876 |
| 5,815,491 | 9/1998 | Guibert | 370/233 |
| 5,815,677 | 9/1998 | Goodrum | 395/306 |
| 5,819,083 | 10/1998 | Chen et al. | 395/610 |
| 5,838,994 | 11/1998 | Valizadeh | 395/876 |
| 5,845,153 | 12/1998 | Sun et al. | 395/876 |

OTHER PUBLICATIONS

"Microsoft® Windows NT™ Server Cluster Stragegy: High Availability and Scalability with Industry–Standard Hardware"; A White Paper from the Business Systems Division of Microsoft; 1995; pp. 1–9.

*Primary Examiner*—Mark H. Rinehart
*Attorney, Agent, or Firm*—Gary S. Williams; Pennie & Edmonds LLP

[57] ABSTRACT

In a distributed computer system, a sending node prompts a receiving node to allocate and export to the sending node one or more memory "segments". Each allocated segment is sufficiently large to hold multiple receive buffers whose size fall within a predefined range of receive buffer sizes. Once a segment has been allocated and exported, the sending node allocates receive buffers within the segment, using sequentially contiguous portions for successive receive buffers, without any interaction with the receiving node. Messages are transmitted to the receiving node by remotely writing the data portion of each message to an allocated receive buffer and writing a control message with a pointer to the corresponding receive buffer to a message queue in the receiving node. The receiving node processes messages within the portions of the allocated segments specified by each control message and does not keep track of the used and/or unused portions of each segment. Only the sending node keeps track of the unused portions of each allocated segment. As a result, the computational and communication resource overhead associated with allocating receive buffers is substantially reduced. Once the sending node has exhausted a segment, it sends either a segment release message or segment recycle message to the receiving node. Recycling the segment causes the receiving node to re-enable the sending node to use the segment once the receiving node has processed all the messages previously written to receive buffers in the segment.

12 Claims, 12 Drawing Sheets

Procedure: Request Segment Release
374

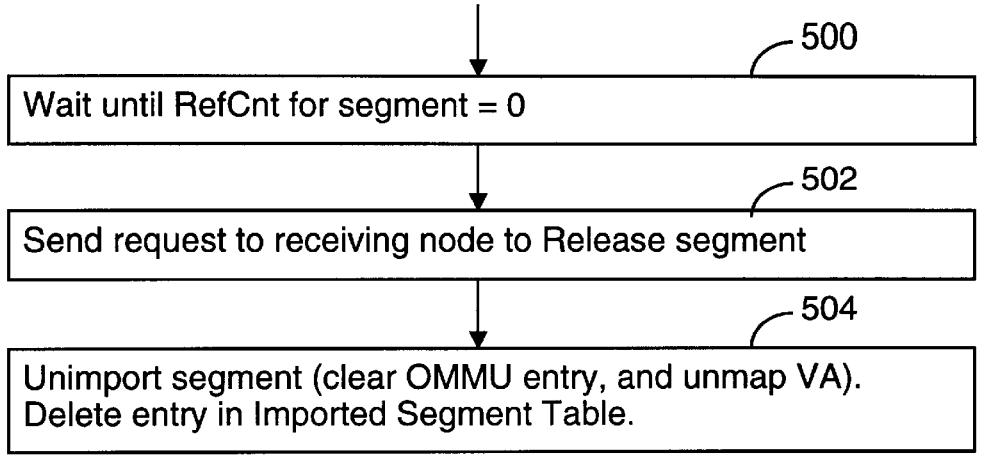

FIG. 12A

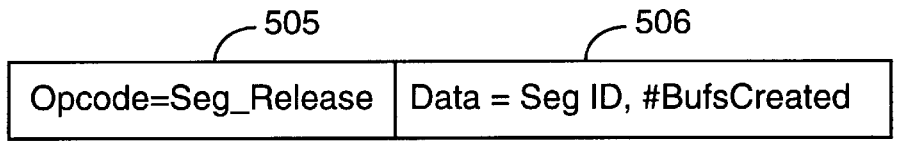

FIG. 12B

Procedure: Process Segment Release Request
358

| 510 |
|---|
| ExportedSegTableEntry.Expected = Msg.#BufsCreated<br>ExportedSegTableEntry.Status = Released |

| 512 |
|---|
| Wait until ExportedSegTableEntry.Received<br>    = ExportedSegTableEntry.Expected<br>    AND<br>    ExportedSegTableEntry.RefCnt=0 |

| 514 |
|---|
| Deallocate memory for Segment.<br>Delete ExportedSegTable Entry for the released segment.<br>Delete IMMU entry and VA mapping for Segment |

FIG. 12C

SYSTEM AND METHOD FOR REMOTE BUFFER ALLOCATION IN EXPORTED MEMORY SEGMENTS AND MESSAGE PASSING BETWEEN NETWORK NODES

The present invention relates generally to systems and methods for enabling a first computer to allocate buffers in a second computer and for managing use of the allocated buffers when sending messages to the second computer.

BACKGROUND OF THE INVENTION

In many multiple-processor computer systems it is important for processes or tasks running on one computer node (sometimes called the sender or sending computer) to be able to transmit a message or data to another computer node (sometimes called the receiver or receiving computer). A necessary aspect of such message passing is the allocation of buffers in the receiving computer's memory and the establishment of memory management and message transport mechanisms to enable the sending computer to remotely write the contents of a message into the memory of the receiving computer.

While some prior art system use a "streaming type messaging environment" in which space is allocated for storing received messages on the fly, as messages are received), the present invention is relevant to distributed computer systems using a "shared memory messaging environment" in which memory for storing messages is allocated in advance, assigned global addresses and exported to a other computer node.

Typically, most prior art systems use one of two models for setting up message receive buffers. In the first model the receiving computer sets up a number of message receive buffers in advance, each buffer having an associated fixed size, and then tells the sending node the location and size of each of those buffers. Each message receive buffer is used just once by the sending computer. When the sending computer needs additional buffers, it requests them from the receiving computer, or the receiving computer automatically allocates new buffers for the sending computer based on usage of the previously allocated buffers.

In the second model, each time the sending computer wants to send a message it sends a buffer allocation request to the receiving computer, which then allocates a buffer of the requested size and then sends a memory export message to the sending computer to inform it of the allocated buffer's location and associated "global address" range.

Generally, receive buffers cannot be reused by the sending node because the sending node does not know when the receiving node has finished processing the data in them. Typically, the sending node only receives acknowledgments of the successful receipt of each message, and thus the sending node has no basis for determining when a previously used receive buffer is available for re-use. As a result, each receive buffer is typically deallocated by the receiving node after the receiving node is finished processing the data in the buffer and a new buffer is allocated when the sending node needs one. The new buffer may, or may not, be in the exact same memory location as a previous buffer, but all the overhead of allocating the buffer and setting up the memory management unit table entries in both the receiving and sending nodes is incurred for each buffer allocation.

Also, allocation of receive buffers in advance is of limited utility because messages come in a virtually unlimited range of sizes. As a result, even in systems that set up some receive buffers in advance, messages requiring non-standard buffer sizes use the second model described above for allocating a receive buffer of the needed size.

An advantage of the prior art techniques described above, especially the second model, is that it makes efficient use of memory in the receiving node in that little memory is tied up in receive buffers that may be used seldom or never. Also, in systems with light message traffic, the CPU and communications overhead of setting up and tearing down receive buffers is relatively light. However, the system latencies caused by having to wait for a receive buffer to be requested and allocated before transmission of the message can be substantial, and those system latencies can indirectly result in degradation of system performance, especially in multiprocessor systems in which tasks are distributed over multiple processors and message traffic between the processors is heavy and forms an integral part of the data processing being performed.

In summary, there is a need for more efficient receive buffer allocation methodologies, especially in multiprocessor systems with heavy message traffic.

Referring to FIG. 1, there is shown a highly simplified representation of two computer nodes herein called Node A 50, and Node B 52. The computer at each node can be any type of computer. In other words, the particular brand, architecture and operating system is of no importance to the present discussion, so long as each computer node is configured to operate in a networked environment. Each computer node 50, 52 will typically include a central processing unit (CPU) 54, random access memory 56, an internal memory bus 58 and a communications interface 60, often called a network interface card (NIC). The computer nodes communicate with each other by transmitting messages or packets to each other via a network interconnect 62, which may include one or more types of communication media, switching mechanisms and the like.

Each computer node 50, 52 typically also has a non-volatile, non-random access memory device 64, such as a high speed magnetic disk, and a corresponding disk controller 66.

FIG. 2 shows a simplified representation of a conventional communications interface (or NIC) 60, such the ones used in the computer nodes of FIG. 1, showing only the components of particular interest. The NIC 60 typically includes two address mapping mechanisms: an incoming memory management unit (IMMU) 70 and an outgoing memory management unit (OMMU) 72. The purpose of the two memory management units are to map local physical addresses (PA's) in each computer node to global addresses (GA's) and back. Transport logic 74 in the NIC 60 handles the mechanics of transmitting and receiving message packets, including looking up and converting addresses using the IMMU 70 and OMMU 72.

The dashed lines between the memory bus 58 and the IMMU 70 and OMMU 72 represent CPU derived control signals for storing and deleting address translation entries in the two MMU's, typically under the control of a NIC driver program. The dashed line between the memory bus 58 and the transport logic 74 represents CPU derived control signals for configuring and controlling the transport logic 74.

Memory Mapping between Virtual, Local Physical and Global Address Spaces

Referring to FIGS. 3 and 4, the nodes in a distributed computer system (such as those shown in FIG. 1) utilize a shared global address space GA. Each node maps portions of its local address space into "windows" in the global address space. Furthermore, processes on each of the nodes map portions of their private virtual address space VA into the local physical address space PA, and can furthermore export a portion of the local physical address space PA into a window in the global address space GA. The process of "exporting" a portion of the local physical address space is also sometimes referred to as "exporting a portion of the local physical address to another node," because another computer node is given read and/or write access to the exported portion of the local physical address space via an assigned global address space range.

It should be noted that the local physical addresses (e.g., PA1 and PA2) shown in FIGS. 3 and 4 are physical bus addresses and are not necessarily memory location addresses. In fact, many physical addresses are actually mapped to devices other than memory, such as the network interface. For example, when physical memory on a first computer is exported to a second computer, the physical addresses used in the second computer to write to the exported memory are not mapped to any local memory; rather they are mapped to the second computer's network interface.

When data is written by a process in Node A 50 to a virtual address corresponding to a location in Node B 52, a series of address translations (also called address mapping translations) are performed. The virtual address VA1 from the process in node A is first translated by the TLB (translation lookaside buffer) 80-A in node A's CPU 54-A into a local (physical) I/O address PA1. The local (physical) I/O address PA1 is then translated by the outgoing MMU (OMMU) 72-A in node A's network interface 60-A into a global address GAx. When the data with its global address is received by node B (usually in the form of a message packet), the global address GAx is converted by the incoming MMU (IMMU) 70-B in node B's network interface 60-B into a local physical address PA2 associated with node B. The local physical address PA2 corresponds to a virtual address VA2 associated with a receiving process. A TLB 80-B in node B's CPU 54-B maps the virtual address VA2 to the local address PA2 where the received data is stored.

It should be noted that the term "message transmission" is sometimes used to indicate or imply the use of a message transmission protocol in which the receiving node automatically processes the transmitted message, while the term "data transmission" simply indicates the writing or copying of data from one system to another. However, in this document, the terms message transmission and data transmission will be used interchangeably.

It should be noted here that TLBs generally only translate virtual addresses into local physical addresses, and not the other way around, and thus some of the arrows in FIG. 4 represent mappings rather than actual address translations. When the receiving process in the node B reads a received message at address VA2, the TLB 80-B will translate that virtual address into the same local address PA2 determined by the network interface's IMMU 70-B as the destination address for the received message.

Address space ranges for receiving messages are pre-negotiated between the sending and receiving nodes using higher level protocols that typically use reserved address space, mailbox, or packet based communications that are set up for this purpose. The details of how windows in the global address space are assigned and how receiver side addresses are set up for receiving messages are beyond the scope of this document. Furthermore, the present invention does not require any changes in such communication setup mechanisms.

Receive buffers are allocated in conveniently sized chunks using a corresponding MMU entry. Larger receive buffers, or receive buffers of irregular size, may be constructed using multiple MMU entries by user level protocols. Once the receive buffers are allocated and the corresponding MMU mappings are established, user level programs can read and write to the receive buffers without kernel intervention. Many different kinds of user-level message passing "API's" (application program interfaces) can be built on top of the basic receive buffer mechanism. This includes the send and receive UNIX™ (a trademark of SCO) primitives, sockets, ORB (object resource broker) transport, remote procedure calls, and so on. The basic message passing mechanism is designed to be as "light weight" and efficient as possible, so as to take as few processor cycles as possible.

The present invention utilizes the local physical address to global address mapping mechanisms discussed above.

Conventional Buffer Allocation and Message Passing Methodology

FIG. 5 shows the conventional procedure for a process on node A to write a message into a receive buffer at node B. The first step is for Node A to send a request to Node B to set up a receive buffer of a specified size so that Node A can write a message into it (step 100).

Node B then sets up one or more receive buffers and "exports" the memory allocated to the receive buffer(s) to node A (step 101). In some implementations, this step may be performed in advance, because it is known in advance that Node A will be sending many messages to Node B. The memory exporting step 101 is performed by creating an IMMU entry in Node B that maps the physical address range of a receive buffer in Node B's memory to a corresponding range of global addresses, and also by setting up a corresponding virtual address to physical address mapping. As indicated above, Node B will typically have a range of global addresses preassigned to it for exporting memory to other nodes. However, other mechanisms for assigning global addresses would be equally applicable.

Next, at step 102, a memory export message is transmitted by Node B to Node A that specifies:

the destination node to which the message is being transmitted;

the source node from which the message is being sent;

the global address range corresponding to the receive buffer being exported to Node A; and other parameters, such as protocol parameters, not relevant here.

At Node A, when the memory export message is received, Node A's NIC driver sets up an OMMU entry to import the memory being exported by Node B, (step 104), and also sets up a corresponding virtual address to physical address mapping so that a process in Node A can write data into the receive buffer. The OMMU entry set up at step 104 maps the global address range specified in the received message to a corresponding range of physical memory in the server node. If necessary (e.g., if insufficient contiguous memory is available and/or the size of the mapped address range is not equal to $2^n$ pages), the server node will generate two or more OMMU entries so as to map the specified global address space to two or more local physical address ranges. The mapped local physical addresses in the first computer are not locations in that computer's memory, rather they are otherwise unused addresses that are mapped to the computer's network interface by the OMMU entry or entries.

Once the IMMU in node B and the OMMU in node A have been set up, node A can transmit a message to node B. The dashed line between steps 104 and 106 indicates that no particular assumptions are being made as to the timing relationship between steps 104 and 106 (i.e., one may closely follow the other, or they may be separated both in time and logistically).

Once node A is ready to send a message to node B, the message sending procedure formats and sends the message to the receiving node (step 106). In the case of so-called "long messages", this typically includes using a first remote write operation to write data directly into the receive buffer in the receiving computer and using a second remote write operation to write a control message in to a received message queue in the receiving computer. The control message typically contains a "cookie" that points to the location of the associated message, that is it points to the receive buffer in which the data portion of the message has been stored.

Additional information about the use of remote writes to send messages between computer nodes and associated issues (i.e., other than the buffer allocation and usage issues addressed by the present document) can be found in U.S. patent application Ser. No. 08/885,153, filed Jun. 30, 1997, which is hereby incorporated as background information.

After the message has been written into the receive buffer in the receiving node, a trigger message is typically sent to Node B's network interface (step 116), which triggers the execution of a procedure in Node B for processing received messages (e.g., by inspecting the received message queue to determine what new messages have been received, and so on).

At some point after the message has been sent and processed, the message sending thread in node A unimports or releases the receive buffer it has used by tearing down or modifying the OMMU entry and the virtual to physical address mapping for the previously imported memory (step 118).

Node B, responds to either the receipt of the short message and/or the trigger message by processing the received short message and then the main data portion of a received long message, if any (step 120). In addition, or as part of step 120, Node B will also modify or tear down the IMMU entry and the virtual to physical address mapping for the receive buffer (step 122) so as unexport the receive buffer.

Of course, the prior art includes many variations on the sequence of operations described above with reference to FIG. 5 for performing remote write operations. However, the steps described are typical for distributed computer system using UNIX™ (a trademark of SCO) type operating systems, such as Solaris™ (a trademark of Sun Microsystems, Inc.).

SUMMARY OF THE INVENTION

The present invention is a system and method for enabling a first computer to remotely allocate buffer space in a second computer so as to make the process of allocating receive buffers for message passing efficient. In concept, the first computer (also called the sending node) prompts the second computer (also called the receiving node) to allocate and export to the first computer one or more memory "segments". Each allocated segment is sufficiently large to hold multiple receive buffers whose size fall within a predefined range of receive buffer sizes.

Once a segment has been allocated and exported, the sending node allocates receive buffers within a segment, using sequentially contiguous portions for successive receive buffers, without any interaction with the receiving node. Messages are transmitted to the receiving node by remotely writing the data portion of each message to an allocated receive buffer and writing a control message with a pointer to the corresponding receive buffer to a message queue in the receiving node. The receiving node processes messages within the portions of the allocated segments specified by each control message and does not keep track of the used and/or unused portions of each segment. Only the sending node keeps track of the unused portions of each allocated segment. As a result, the computational and communication resource overhead associated with allocating receive buffers is substantially reduced.

Once the sending node has exhausted a segment (generally by using at least a predefined portion of the segment), it sends either a segment release message or segment recycle message to the receiving node. The segment release message causes the segment to be unexported and deallocated once the receiving node has processed all the messages in the segment, while the segment recycle message causes the receiving node to re-enable the sending node to use the segment once the receiving node has processed all the messages in the segment.

BRIEF DESCRIPTION OF THE DRAWINGS

Additional objects and features of the invention will be more readily apparent from the following detailed description and appended claims when taken in conjunction with the drawings, in which:

FIG. 12A is a flow chart of an "request segment release" procedure used by a sending computer in a preferred embodiment of the present invention.

FIG. 12B depicts the data structure of a release segment message.

FIG. 12C is a flow chart of a "process segment release request" procedure used by a receiving computer in a preferred embodiment of the present invention.

DESCRIPTION OF THE PREFERRED EMBODIMENTS

Figure 1:
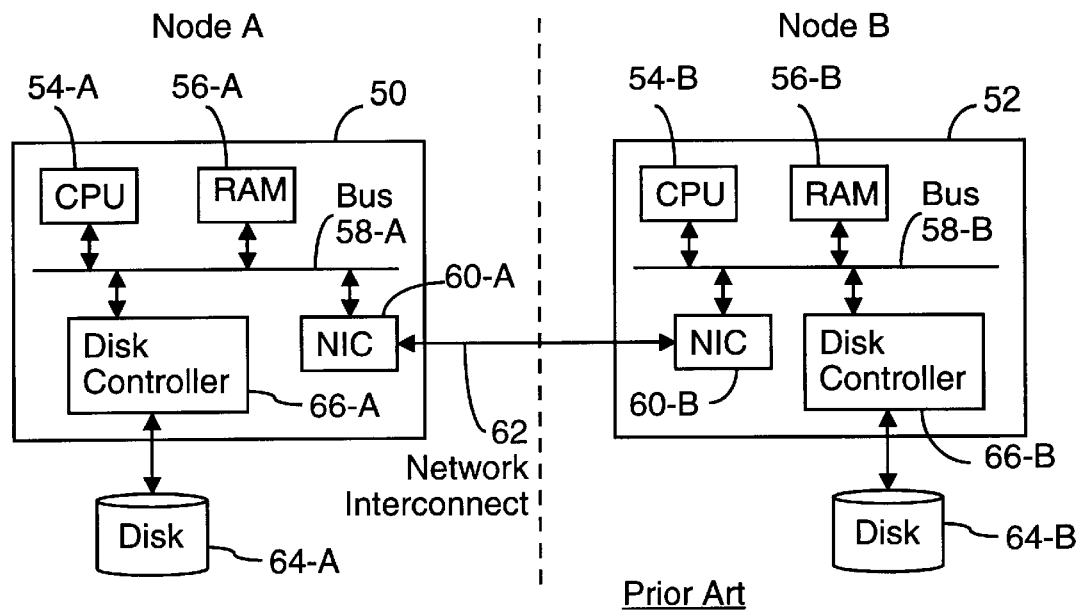
FIG. 1 is a block diagram of two computer nodes in a computer network.
Figure 2:
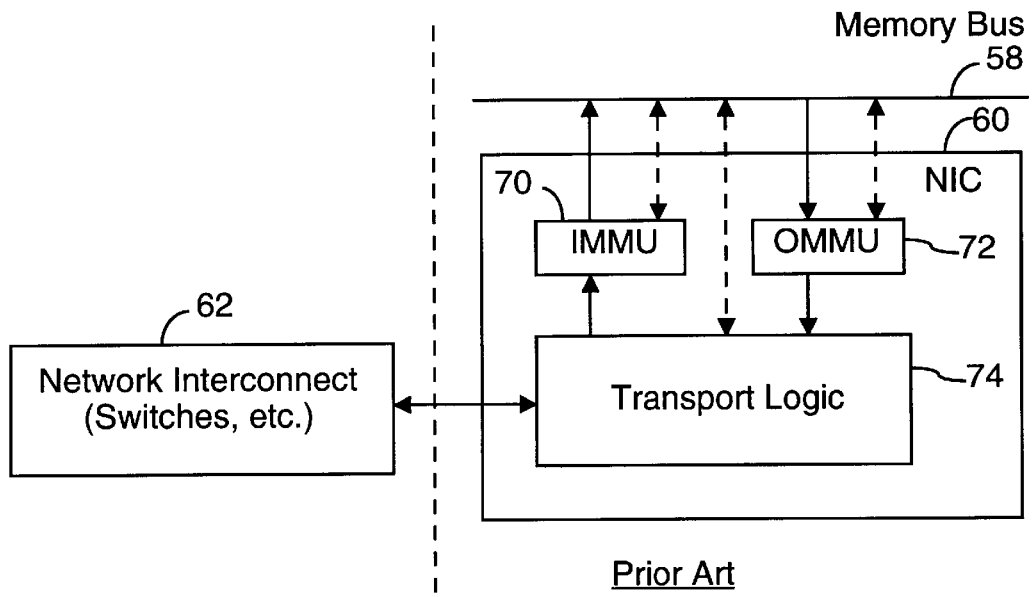
FIG. 2 is a block diagram depicting the components of the communications interface found in each computer of a computer network.
Figure 3:
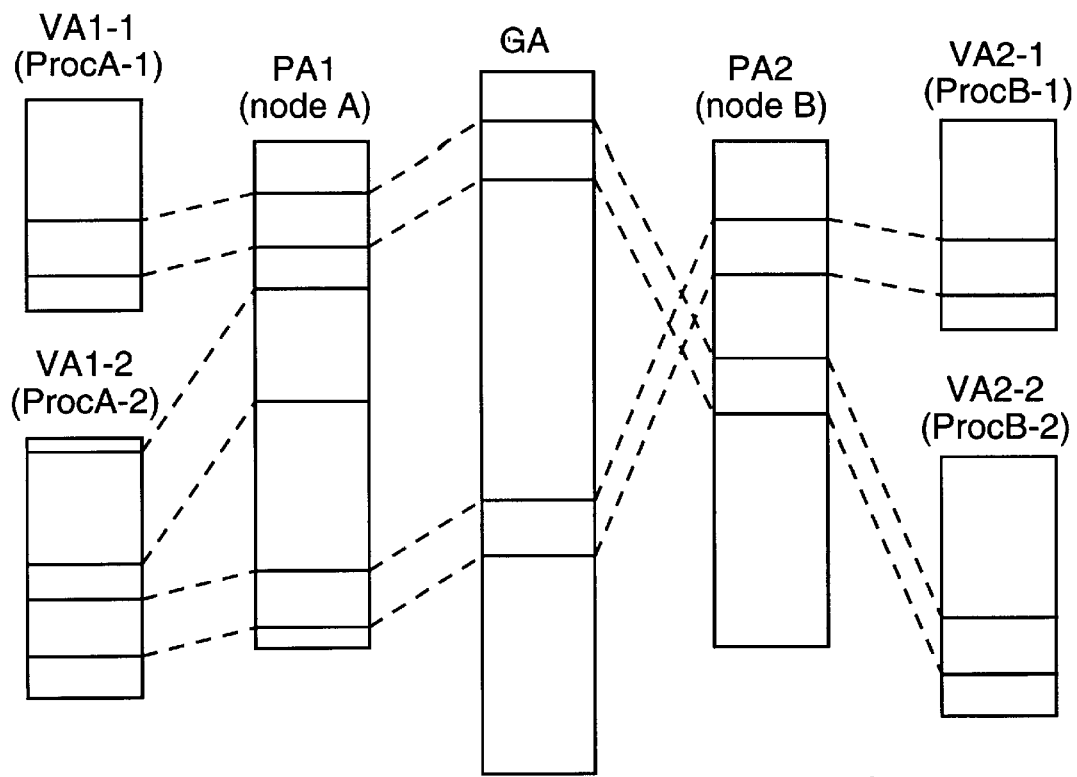
FIG. 3 depicts virtual, local and global address spaces and mappings between those address spaces.
Figure 4:
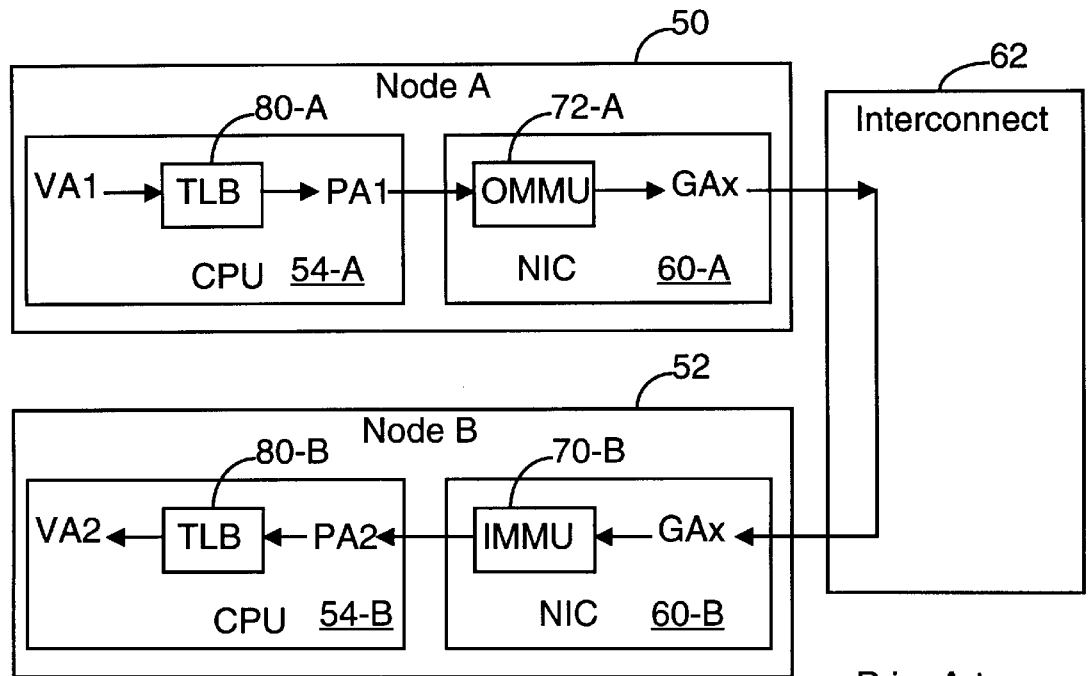
FIG. 4 is a block diagram of the computer modules used to perform address translations associated with transmitting data from a first node to a second node of a distributed computer system.
Figure 5:
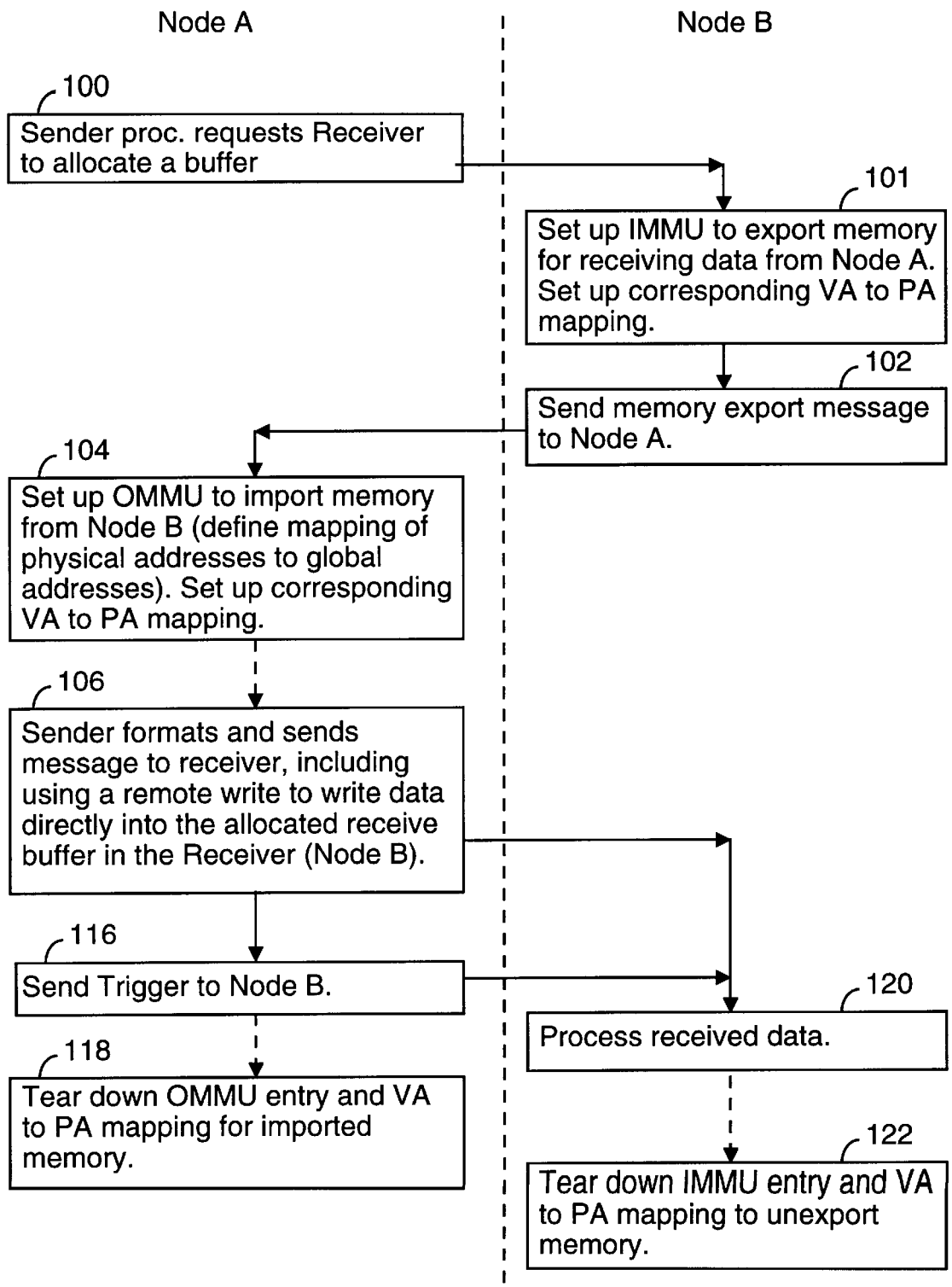
FIG. 5 is a flow chart of a conventional procedure for allocating a receive message buffer and for sending a message using the allocated buffer.
Figure 6:
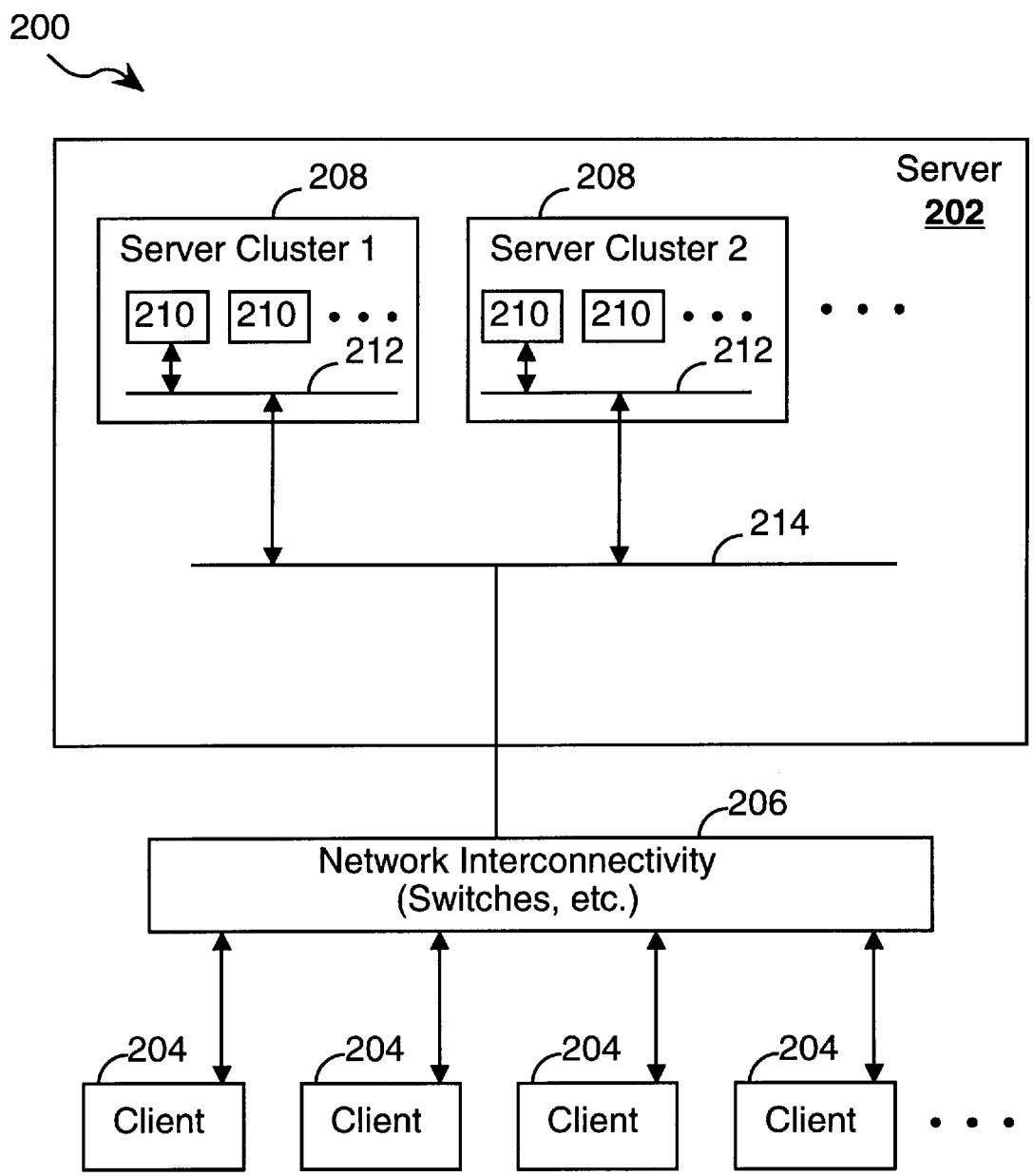
FIG. 6 depicts a computer system having a cluster of computers operating as a single server node.

The present invention is directed at a method of making message transmission operations more efficient, especially in an environment such as the server cluster environment shown in FIG. 6.

Server Cluster

Referring to FIG. 6, there is shown a distributed computer system 200 that includes a multi-CPU server 202 and numerous client computers 204 that are coupled to the server via one or more communication networks 206. The server 202 includes one or more a clusters 208 of computers 210 so as to provide more computational services to the clients 204 than could be provided by a single server computer. The server 202 is sometimes referred to as "the server cluster." For the purposes of the present document, it is irrelevant whether two server computers 210 that need to share information are in the same or different clusters 210.

Computational and file serving tasks are distributed over the server's computers 210. As a result, the data needed by a process running on one server computer may be located in another server computer. Message communications between nodes within the server cluster 202 are fast and highly reliable, with error or failure rates typically less than one per million messages.

For the purposes of describing the present invention, the terms "sender" (or sending node) and "receiver" (or receiving node) will both be used to refer to computers 210 within the server 202. However, the present invention could also be used to perform remote writes between any "true" client computer 204 and a server computer 210 in the server cluster 202, so long as remote writes of data between the two computers is known to be highly reliable.

Computer Node Configuration

Figure 7:
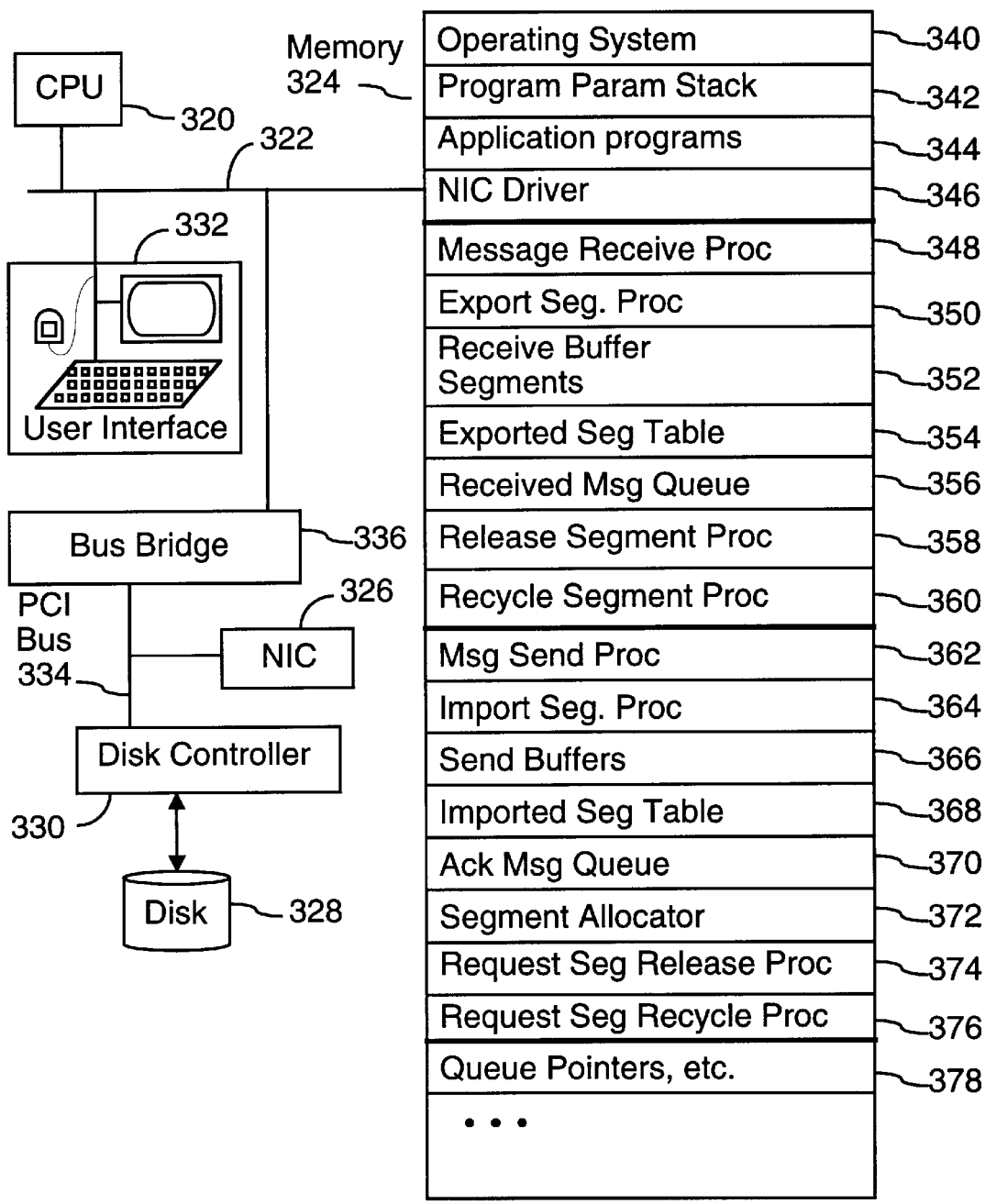
FIG. 7 is a block diagram of a computer incorporating a preferred embodiment of the present invention.

FIG. 7 shows a block diagram of a computer 210 within the server cluster 200 (see FIG. 6). The computer 210 can be either a sending or receiving node with respect to a particular remote messaging operation. The computer 210 includes a CPU 320, an internal communication or memory bus 322, random access memory 324, a communications or network interface (NIC) 326, and a non-volatile, non-random access memory device 328, such as a high speed magnetic disk, and a corresponding disk controller 330.

For the purposes of this document, a "long message" is defined to consist of a data portion written to a receive buffer plus a short control message, which typically contains one or more "cookies" that point to the location where the data portion of the long message is stored. However, for convenience, the data portion of a long message is sometimes referred to as the "long message."

In a preferred embodiment, the NIC 326 and disk controller 330 are coupled to a PCI bus 334 that is, in turn, coupled to the main memory bus 322 by a bus bridge 336. The computer's memory 324 stores, usually in conjunction with the disk storage device 328:

- an operating system 340 (e.g., Sun Microsystems' Solaris™ operating system);
- a program parameter stack 342 for each thread, used to pass parameters during procedure calls and returns, as well as other purposes well known to those skilled in the art;
- application programs 344, including application programs that can initiate the transmission of data to another node, request data from a remotely located disk storage device, and so on;
- a NIC driver 346 for controlling the network interface 326 and for managing use of the IMMU and OMMU therein (not shown in FIG. 7);
- a message receive procedure 348 (which is preferably implemented as part of the operating system's kernel) for processing received messages (i.e., passing them to appropriate applications for processing), and managing the received message queue;
- a segment exporting procedure 350 for exporting a memory segment to another computer node;
- a set of receive buffer segments 352, which are the segments exported by the segment exporting procedure 350;
- an Exported Segment Table 354, for keeping track of the segments allocated and exported to another computer node;
- a received message queue 356 for receiving control messages and the like from other nodes after they have transmitted data to one or more receive buffers within one or more of the segments 342, and for receiving short messages from other nodes;
- procedures 358, 360 for respectively releasing and recycling segments at the request of a sending node to which the segments have previously been exported;
- a message sending procedure 362 (which is preferably implemented as part of the operating system 340) for sending long messages to a remote node;
- a segment importing procedure 364 for importing a memory segment from another computer node;
- a set of send buffers 366 for storing the data portion of messages to be transmitted to a receiving computer node;
- an Imported Segment Table 368, for keeping track of the segments imported from another computer node;
- an ack message queue 370 for storing data indicating the status of messages transmitted to other nodes;
- a segment allocator 372, for allocating portions of a segment to form receive buffers; and
- procedures 374, 376 for respectively requesting releasing and recycling of a segment;
- message and ack queue pointers and local variables 378 for managing use of the received message and ack message queues for both sending and receiving messages.

Memory Segment Data Structures

Figure 8:
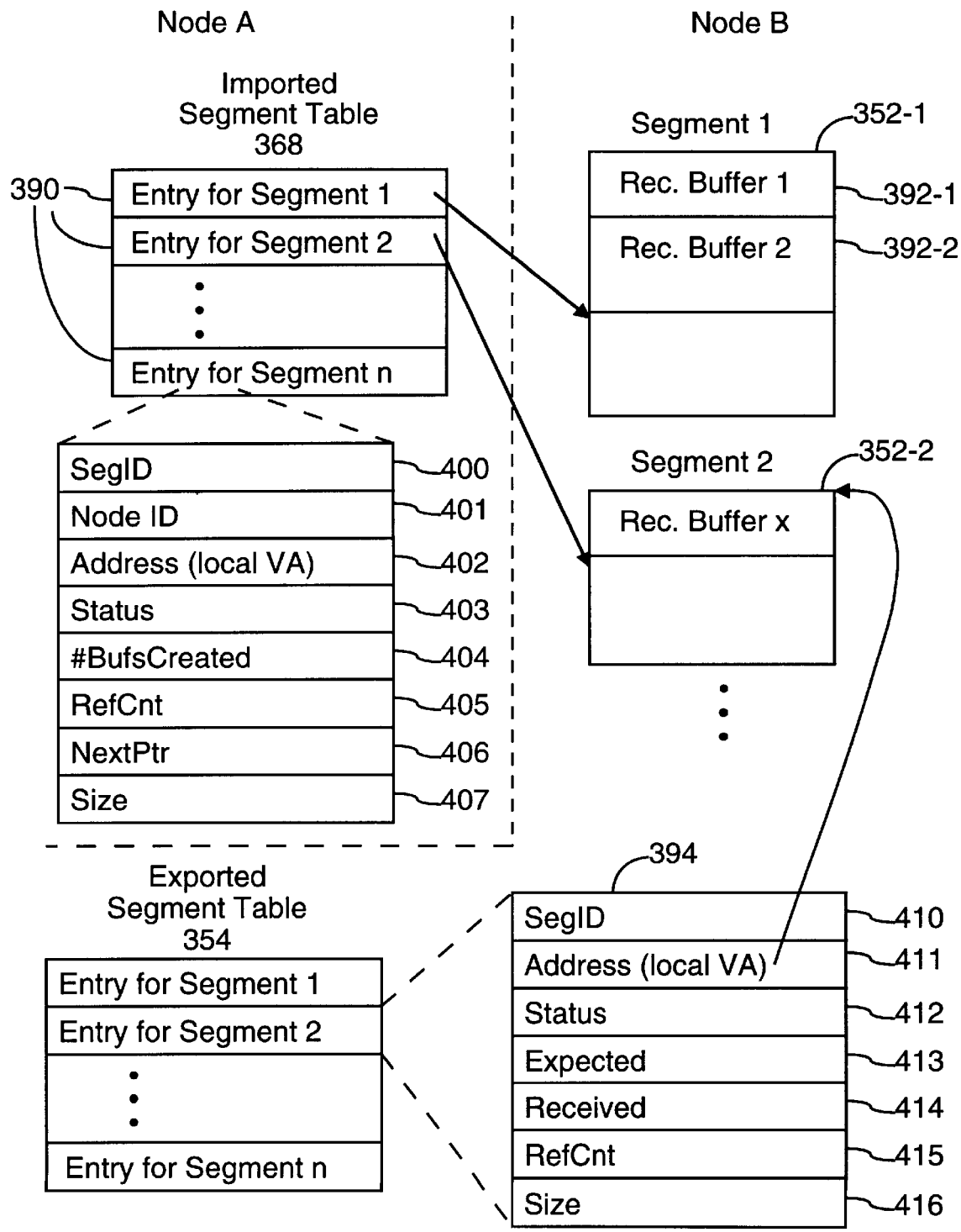
FIGS. 8 depicts the segment, imported segment table and exported segment table data structures used in a preferred embodiment of the present invention.

Referring to FIG. 8, each memory segment 352 allocated by a receiving node (Node B in FIG. 8) is preferably sized so as to be sufficient to hold several (e.g., 4 to 100) receive buffers 392 whose size fall within a predefined range of receive buffer sizes. For instance, a sending node (Node A in FIG. 8) might request the allocation of two segments for "short messages" having a first predefined size range, two segments for "medium length messages" having a second predefined size range, and two segments for "long messages" having a third predefined size range.

To keep track of the segments imported by a sending node from a particular receiving node, each sending node maintains an Imported Segment Table 368 that contains one entry 390 for each imported segment 352. In some embodiments of the present invention, each computer node maintains a separate Imported Segment Table for each receiving node from which it has imported memory segments, and in other embodiments each computer node maintains a single Imported Segment Table. Since each entry uniquely identifies a corresponding segment with respect to the entire distributed computer system, we will assume the use of a single Imported Segment Table.

Each entry in the Imported Segment Table contains information about one particular imported segment and includes the following fields:

SegID 400, which along with the Node ID 401 uniquely identifies the segment through the entire distributed computer system; the SegID 400 is generated by the receiving node that allocated the corresponding imported segment;

Node ID 401, which identifies the computer node where the corresponding segment is physically located;

Address 402, which is the local virtual address of the segment;

Status 403, which indicates the state of the associated imported segment; the primary Status values of an imported segment relevant to the present documents are Imported, which indicates the imported segment is available for use, and Free, which indicates the segment is not available for use because it is in the process of being released or recycled;

BufsCreated 404, which indicates the number of receive buffers 392 that have been allocated by the sending node within the imported segment;

RefCnt 405, which indicates the number of receive buffers 392 (in the imported segment) that are currently in use by the sending node;

NextPtr 406, which points the unused portion of the segment; and

Size 407, which indicates the size of the segment (e.g., measured in units of bytes or words or any other convenient unit).

To keep track of the segments exported by a receiving node to a particular sending node, each receiving node maintains an Exported Segment Table 354 that contains one entry 390 for each exported segment 352. Each entry in the Exported Segment Table contains information about one particular exported segment and includes the following fields:

SegID 410, which along with the Node ID of the receiving node (i.e., of the node in which the Exported Segment Table is located), uniquely identifies the segment through the entire distributed computer system;

Address 411, which is the local virtual address of the segment;

Status 412, which indicates the state of the associated exported segment; the primary Status values of an imported segment relevant to the present documents are:

Exported, which indicates the segment has been exported to a sending node;

Active, which indicates the sending node has imported the segment and acknowledged receipt of the segment;

Released, which indicates the segment is in the process of being released or recycled; and Free, which indicates the segment is in the process of being deallocated.

Expected 413, which indicates the number of buffers that the sending node says it has allocated in the segment;

Received 414, which indicates the number of buffers in the segment the receiving node has processed;

RefCnt 415, which indicates the number of receive buffers 392 (in the exported segment) that are currently being processed by the receiving node; and Size 416, which indicates the size of the segment (e.g., measured in units of bytes or words or any other convenient unit).

Received Message Queue and Ack Message Queue Data Structures

Figure 9:
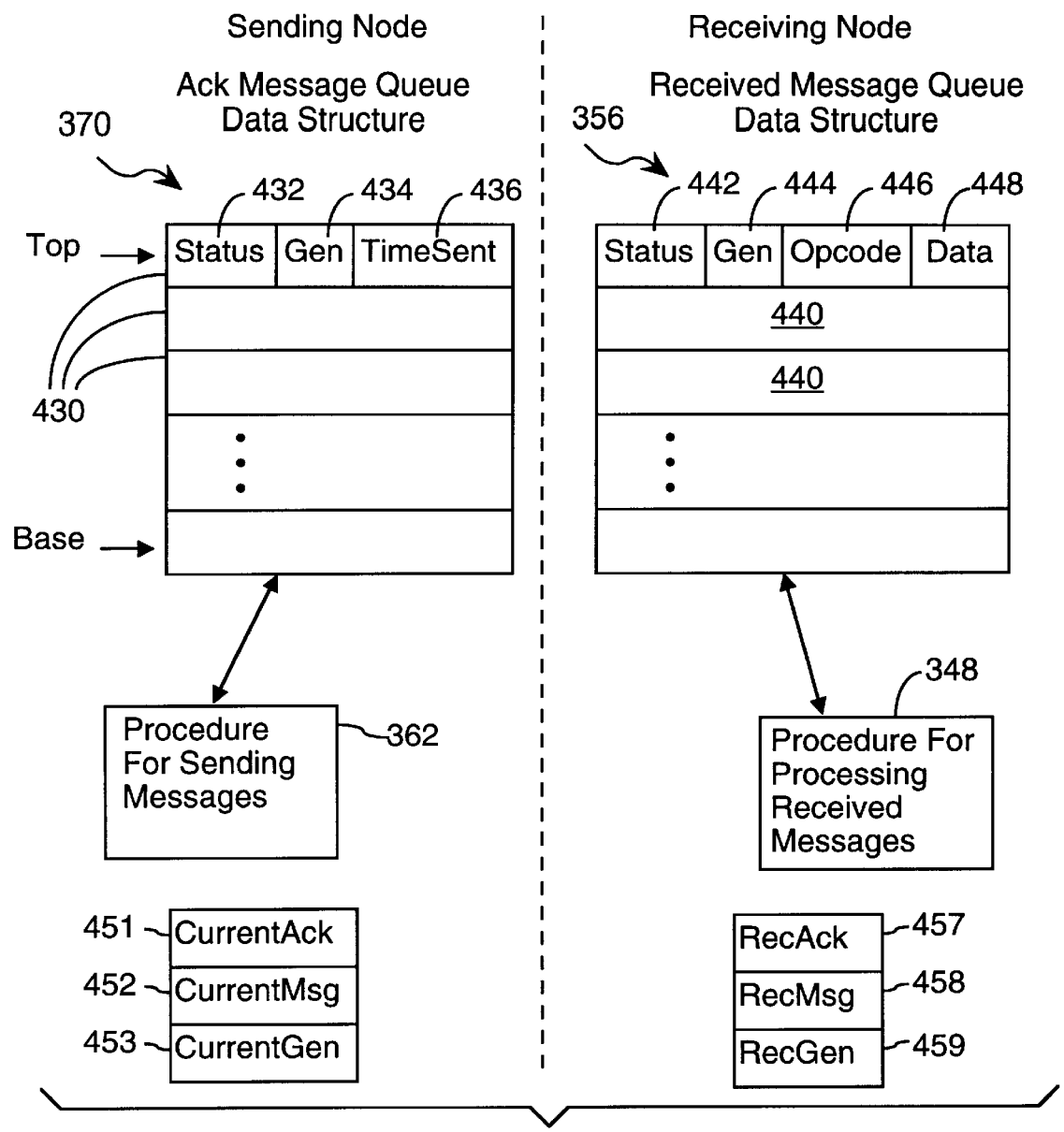
FIG. 9 depicts message queue data structures used in a preferred embodiment of the present invention.

Referring to FIG. 9, the Ack message queue 370 consists of a set of N (e.g., 16 or 32) ack entries 430, each of which is used to keep track of the status of one message transmitted to another node. Each ack entry 430 includes the following information fields:

Status 432, which can have one of two values: Msg_Sent, which indicates that a message was sent, but has not yet been acknowledged by the receiving node, and Msg_Empty, which indicates that the corresponding message has been acknowledged and processed by the receiving node.

Gen 434, which is equal to 1 or 0. The purpose of the Gen field value is to determine whether or not a Status value in a respective received message queue entry corresponds to (A) the most recent message for this ack queue entry, or (B) the previous message for this ack queue entry. The Gen value to be stored in each of the ack message queue entries is toggled each time all the slots in the ack message queue have been used. Thus, a Gen=0 value will be used for the transmission of N messages, at which point the next ack queue entry is at the base again and the Gen value is changed to Gen=1 for the next N messages. The Gen field 384 is used to help determine whether or not the node to which a message has been sent actually received the Msg_Sent status value, which enables processing of the message by the receiving node. In particular, if the received message queue entry 390 corresponding to an ack queue entry has a different Gen value 394 from the ack message queue entry 380, that means the Msg_Sent status value for the message was not successfully received.

TimeSent 436, which represents the time at which the corresponding message was transmitted to a destination node. When a message's transmission is not acknowledged within a certain amount of time of its transmission, special measures are undertaken (as explained below) to resolve the problem.

The pointers and generation values maintained at each node are as follows:

The CurrentAck pointer 451 points to the ack queue entry currently being used.

The CurrentMsg pointer 452 points to the message queue entry 440 in the receiving node that corresponds to the current ack queue entry 430.

The CurrentGen value 453 is the gen value for the current ack queue entry.

The RecAck 457, RecMsg 458 and RecGen 459 values are pointer and generation values used by the receive message procedure for processing received messages and sending acknowledgments to the node that sent each such message.

Each time a message is transmitted, (A) the sending node stores corresponding values in an ack queue entry 430, and (B) a bump( ) procedure is called that advances the CurrentAck 451 and CurrentMsg 452 pointers to the point to the next ack and received message queue entries. If the current ack entry is the top entry in the ack message queue, the bump( ) procedure resets the CurrentAck 451 and CurrentMsg 452 pointers to point to the base ack message queue entry and the base received message queue entry (in the receiving node), respectively, and updates the CurrentGen 453 to a next (different) value from its prior value.

The received message queue 356 consists of a set of N (e.g., 16 or 32) entries 440, each of which is used to store one message received from another node. Each receive message entry 440 includes the following information fields:

Status 442, which can have one of three values:

Msg_Sent, which indicates that a message was received, but has not yet been processed or acknowledged by the receiving node, Msg_Rcvd, which indicates the message is being processed, but has not yet been acknowledged; and Msg_Empty, which indicates that the processing of the message has been initiated and an acknowledgment has been transmitted to the sending node.

Gen 444, which is equal to 1 or 0, and is the generation value written into the queue entry by the sending node.

Opcode 446, which indicates the type of message and the procedure needed to process it. For instance, some opcodes indicate the message is a protocol message, while other opcodes indicate that the message needs to be processed by an application program.

Data 448, represents either the body of a short message, or one or more "cookie" data structures used to denoting the location of the receive buffer(s) in which the message is located.

In a preferred embodiment the Status and Gen fields 442, 444 of each received message queue entry 440 are stored in a single byte or word, and are preferably written together using a single write operation because the storage of both items must either succeed or fail together. That is, it would be completely unacceptable for the Status value to be successfully written into the message queue entry, but for the writing of the Gen value to fail, or vice versa.

From a broader perspective, the Gen field value is a single binary digit (i.e., single bit) sequence number. In an alternate embodiment, the Gen field value could be replaced by a multiple bit sequence number, where each Gen field sequence number would be incremented for an ack queue entry each time a message for that entry is sent to the receiving node. The Gen field sequence number stored in the respective received message queue entry would indicate the last message for which it received Status and Gen field values from the sending node.

Since each node both sends and receives messages, each node has one complete set of the sending node data structures for each other node to which is sends messages, and also has one complete set of the receiving node data structures for each node from which it receives messages.

The use of the ack and receive message queues by the message send and message receive procedures is described in more detail in the previously referenced U.S. patent application.

Cookie Data Structure

Figure 10:
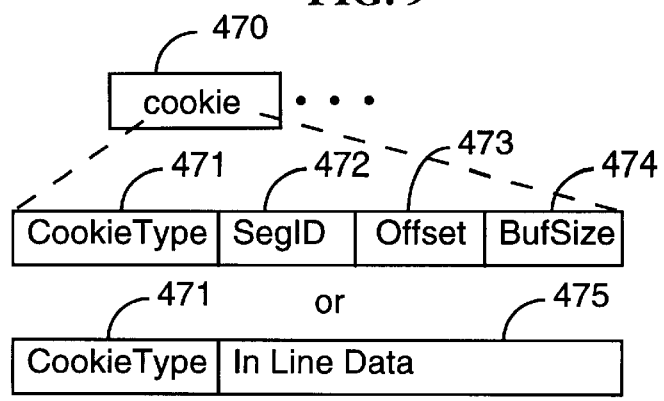
FIG. 10 depicts a cookie data structure used in a preferred embodiment of the present invention.

Referring to FIG. 10, each control message stored in the received message queue 356 will contain at least one "cookie" data structure (usually called a cookie) 470 if the corresponding message is a long message having one or more data portions stored in one or more receive buffers. Each cookie 470 has a CookieType field 471, which can have one of three values:

regular cookie, which indicates the cookie points to a receive buffer;

multiple cookie, which indicates the cookie points to a buffer storing multiple cookies, each of which points to a receive buffer; or short message cookie, which indicates that the remainder of the cookie contains the data portion of a short message.

Then, depending on the type of cookie, the cookie has either an In Line Data field 475, which represents the data portion of a short message, or it has the following three fields:

SegID 472, which indicates the SegID of the segment containing the receive buffer pointed to by the cookie.

Offset 473, which indicates the offset from the beginning of the segment to the beginning of the receive buffer.

BufSize 474, which indicates the size of the receive buffer.

Preferred Embodiment of the Procedures for Importing and Exporting A Segment

Figure 11A:
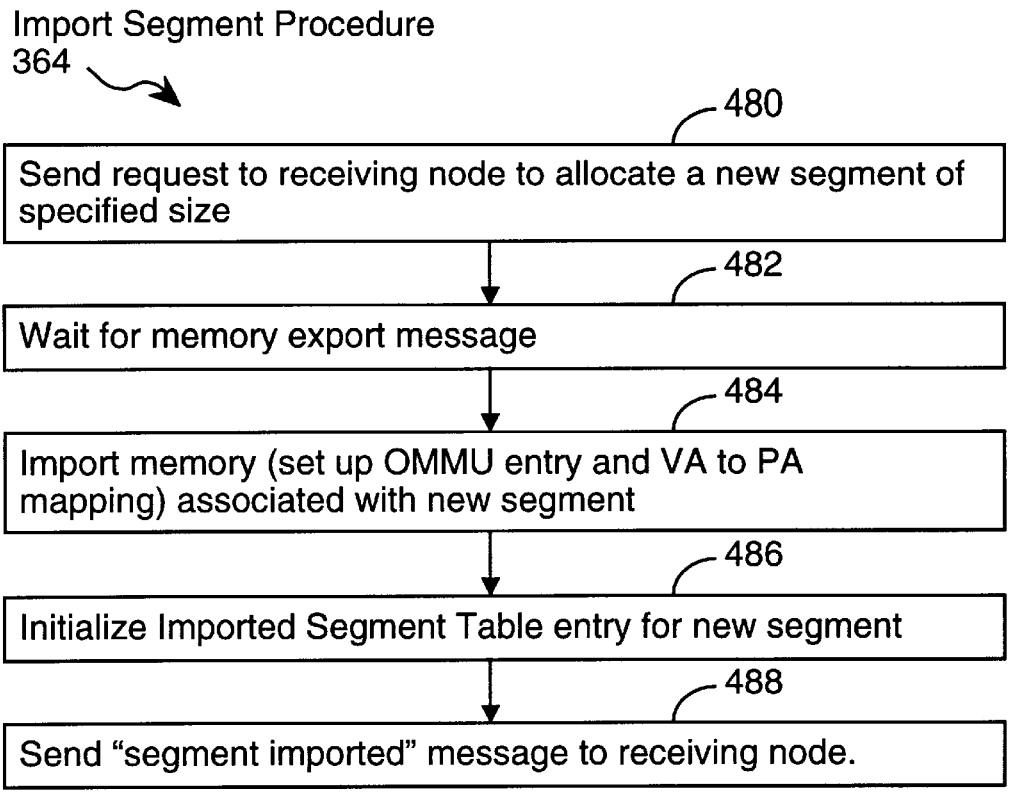
FIG. 11A is a flow chart of an "Import Segment" procedure, used by a sending computer to request and import a new message buffer segment from a receiving computer in a preferred embodiment of the present invention.

Referring to FIG. 11A, in the preferred embodiment, whenever the sending node requires a new or additional segment, the Import Segment procedure 364 is called. This procedure sends a "request segment" message to the receiving node, requesting that it allocate and export a memory segment of a specified size (step 480), and then waits to receive a memory export message (step 482). The memory export message, when received, specifies the global address range associated with the memory segment being exported to the sending node, and the SegID assigned by the receiving node to the memory segment.

Once the sending node receives the corresponding message export message from the receiving node, the sending node imports the memory segment by setting up an OMMU entry to map the global address range for the memory segment to a corresponding range of local physical addresses, and by also setting up a corresponding virtual address to physical address mapping (step 484) so that a process in the sending node can write data into receive buffers in the segment.

In addition, the sending node initializes an entry in the Imported Segment Table for the new segment (486). The entry in the Imported Segment Table indicates the imported segment's SegID, Node ID, local virtual Address, and size. The Status is initialized to Imported, the #BufsCreated and RefCnt fields are initialized to zero values, and NextPtr is set equal to the segment's Address. Finally, a "segment imported" message is sent to the receiving node to inform the receiving node that the segment has been successfully imported (step 488).

Figure 11B:
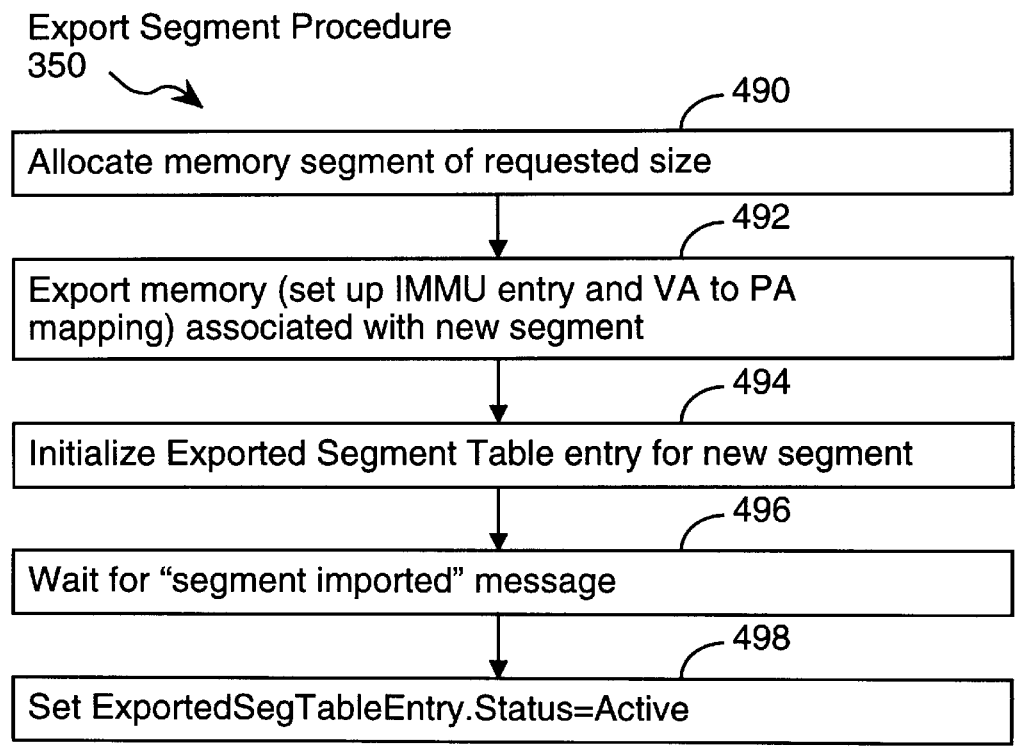
FIG. 11B is a flow chart of an "Export Segment" procedure, used by a receiving computer to allocate and export a message buffer segment to a sending computer in a preferred embodiment of the present invention.

Referring to FIG. 11B, the Export Segment procedure 350, which is executed by a receiving node and works in conjunction with the Import Segment procedure 364 being executed by a sending node, responds to a segment allocation request by the sending node as follows. First, the procedure, as executed by the receiving node, allocates a memory segment of the requested size (step 490), and exports the memory segment to the requesting sending node (step 492). The exporting step includes setting up an IMMU entry to map the memory segment's physical address range to an assigned corresponding range of global addresses, and also setting up a corresponding virtual address to physical address mapping. In addition, the exporting step includes sending a memory export message to the requesting sending node.

The procedure then initializes an entry in the Exported Segment Table for the new segment (494). The entry in the Exported Segment Table indicates the imported segment's SegID, local virtual Address, and size. The Status is initialized to Exported, and the Expected, Received and RefCnt fields are initialized to zero values.

Next, the procedure waits to receive a "segment imported" message from the sending node (step 496). When the segment imported message is received, the Status of the segment, as represented by the corresponding Exported Segment Table entry is set to Active, to indicate that the segment has been successfully imported by the sending node (step 498).

Segment Release Procedures

Referring to FIG. 12A, whenever the sending node has used at least a predefined portion of a segment, the segment is said to have been exhausted. Alternately, the first time the sending node is unable to allocate a receive buffer from a segment because the remaining unused portion is too small the segment is said to have been exhausted.

When a segment has been exhausted by a sending node, the sending node can execute the Request Segment Release procedure 374 to initiate the deallocation and release of the segment. However, the present invention provides an alternate to releasing an exhausted segment and then requesting the allocation of a new segment. In particular, if the new segment to be requested by the sending node is the same size as the old segment that has been exhausted, then the present invention provides a mechanism for "recycling" the segment, thereby avoiding the need to tear down and rebuild the MMU and virtual memory mappings and Exported and Imported Segment Table entries for old and new segments.

The Request Segment Release procedure 374 begins by waiting until the RefCnt for the segment is equal to zero (step 500), which indicates that the sending node has finished working with all the receive buffers allocated from the segment. Then it sends a Segment Release request message to the receiving node (step 502). After sending the Segment Release request message the procedure unimports the segment by tearing down the OMMU entry for the segment, unmapping the local virtual address range for the segment, and deleting the Imported Segment table entry for the segment.

The structure of the Segment Release request message is shown in FIG. 12B, and includes an Opcode 505 indicating that the message is a Segment Release request message, and a data field 506 that includes the SegID of the segment to be released and the #BufsCreated value, indicating the number of buffers that the sending node allocated within the segment.

Referring to FIG. 12C, the receiving node procedure 358 for processing a Segment Release request is executed in response to the receipt of a Segment Release request message. The procedure begins by setting the Expected field of the Exported Segment Table entry for the specified segment to the #BufsCreated value in the received message, and setting the Status field of the Exported Segment Table entry to a value of Released (step 510). Then the procedure waits until (A) the Received count field in the Exported Segment Table entry equals the Expected field, and (B) the RefCnt equals zero (step 512). These two conditions are met when the receiving node has finished processing all the messages in the receive buffers in the segment to be released, or has at least moved them to other locations for continued processing. Then the procedure releases the segment (step 514) by: (A) deallocating the memory for the segment, (B) deleting the corresponding entry in the Exported Segment Table, (C) tearing down the corresponding IMMU entry, and (D) unmapping the local virtual address range for the segment.

Sending Node Procedure for Sending A Long Message

Figure 13:
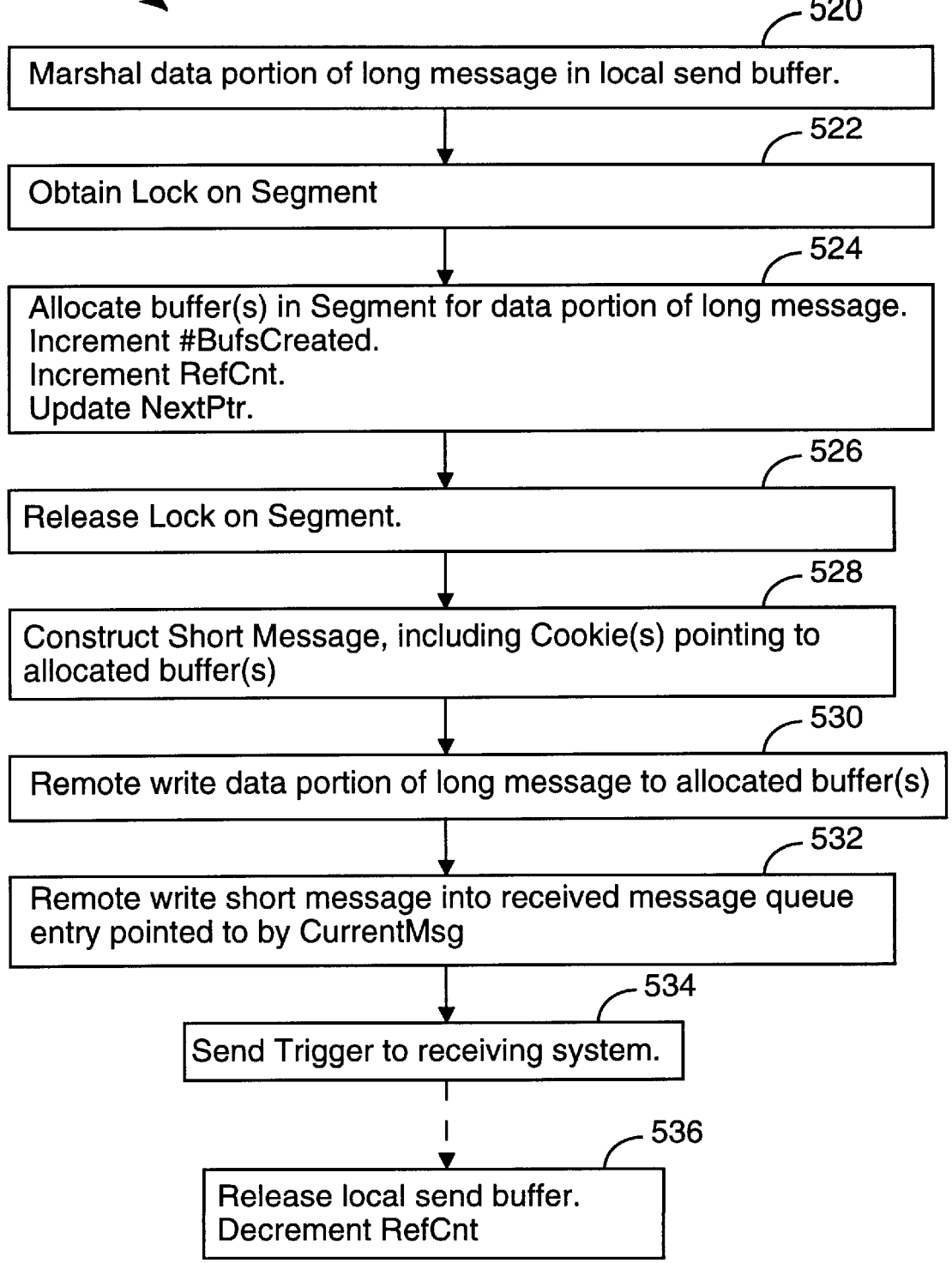
FIG. 13 is a flow chart of a procedure for sending a long message to a receiving computer, using remote buffer allocation by the sending computer in a preferred embodiment of the present invention.

Referring to FIG. 13, the long message sending procedure 362 begins by marshaling the data portion of the long message in a local send buffer (520), which basically means that the data is formatted and stored in a send buffer in a predefined manner suitable for processing by an application procedure in the receiving node. Next, the procedure obtains the lock on the segment from which a receive buffer is to be allocated (step 522).

There is a sending node "lock" which covers each imported memory segment. Depending on the implementation, either one lock can be used for all imported segments, or a separate lock can be used for each distinct imported segment. Use of the lock covering an imported segment is shared by all the sending node procedures using that segment and which protects the segment from two procedures acting on the segment simultaneously. The lock is generally an operating system primitive, the specific implementation of which depends on the operating system being used by the computer in which the present invention is implemented.

After acquiring the segment lock, the procedure allocates one or more receive buffers from the segment. The #BufsCreated field is incremented by 1 for each receive buffer allocated, and the RefCnt field is incremented by 1 regardless of the number of buffers allocated. Furthermore the NextPtr is updated to point to the remaining unused portion of the segment (if any). (step 524). Then the lock on the segment is released (step 526). The lock on the segment is maintained by the message send procedure only while buffers are being allocated and the associated bookkeeping entries are being made in the Imported Segment table.

Next, a short control message is constructed, including a cookie for pointing to each of the allocated receive buffers (step 528).

The data portion of the long message is then remotely written from the send buffer to the allocated buffer(s) (step 530). Then the previously constructed short control message is remotely written into the next available received message queue entry (step 532), which is pointed to by the Current-Msg pointer. Next a trigger is sent to the receiving node's network interface (step 534), which triggers the execution of a procedure in the receiving node for processing received messages (e.g., by inspecting the received message queue to determine what new messages have been received, and so on).

When the sending node has determined that receiving node has processed the message, using mechanism not relevant here, it releases the local send buffer and decrements the RefCnt for the segment (step 536). Decrementing the RefCnt requires temporary possession of the lock on the segment (not shown in the flow chart of FIG. 13).

Figure 14:
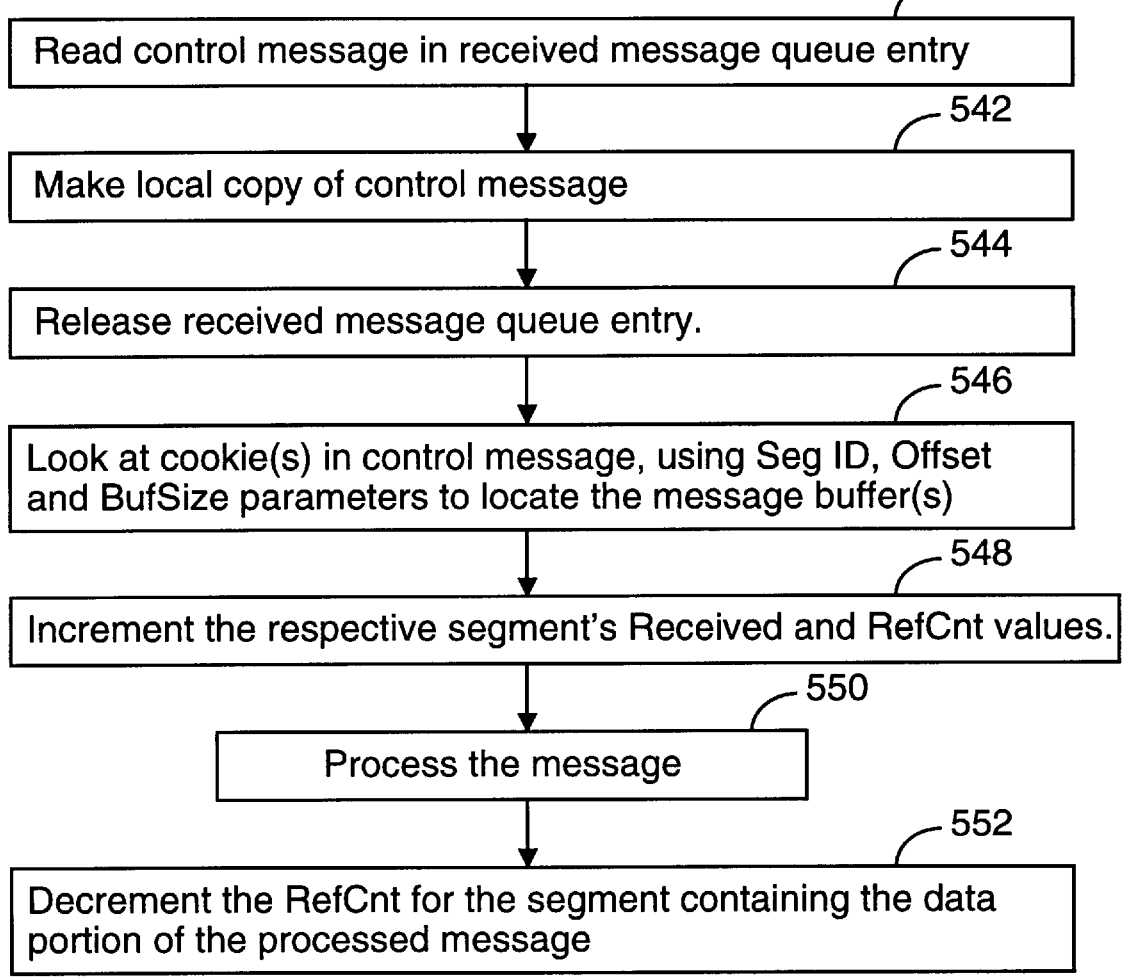
FIG. 14 is a flow chart of procedure for processing a received message in a preferred embodiment of the present invention.

It should be noted the FIGS. 13 and 14 do not include all the details of message transmission and processing, and rather focus on the allocation and use of the receive buffers and memory segment data structures. Additional background information on message transmission and processing can be found in the previously referenced U.S. patent application.

Receiving Node Procedure for Processing Incoming Messages

Referring to FIG. 14, the receiving node procedure for processing incoming (i.e., received) messages is restarted periodically by a timeout thread (not shown). This procedure is also restarted whenever a Trigger is received from the sending node.

The procedure begins by reading a control message in the received message queue (step 540), making a local copy of the control message (step 542) and releasing the message queue entry (step 544), which includes sending an acknowledgment message to the sending system's ack message queue. The procedure then processes the cookie or cookies in the control message, using the SegID, Offset and BufSize parameters in each cookie to locate the corresponding receive buffer (step 546).

Next, the procedure acquires a lock on the segment in which the receive buffer(s) to be processed are located, increments the segment's Received count value by the number of receive buffers used in the received message, and also increments the RefCnt for the segment by 1 (step 548). Then the lock on the segment is released and the data portion of the message in the receive buffer(s) is processed (step 550).

Once the data portion of the message in the receive buffer(s) has been processed, the lock on the segment is reacquired, the RefCnt is decremented by 1 to indicate that the processing of one message has been completed, and the lock is released (step 552).

In summary, the sending node uses the #BufsCreated field to keep track of the number of buffers it allocates within a segment and uses the RefCnt field to keep track of how many messages it is in the midst of transmitting and/or waiting to be processed by the receiving system. The sending node also uses the NextPtr to keep track of the unused portion of the segment, while the receiving node (in which the segment is located) maintains no bookkeeping information about which portions of the segment have been used and which remain unused.

The receiving node uses the Received field to keep track of the number of buffers in the segment that have been referenced by message cookies it has received, and uses the RefCnt field to keep track of how many received messages it is in the midst of processing.

Thus, except for allocating the memory segments themselves, the present invention substantially eliminates the message traffic between the sending and receiving node normally required to allocate individual receive buffers, thereby making the message sending process more efficient.

Procedures for Recycling Segments

A feature of the present invention is that provides an alternative to releasing an exhausted segment and then requesting the allocation of a new segment. In particular, if it is anticipated that a new segment will be needed that is the same size as the segment that has been exhausted, then the present invention provides a mechanism for "recycling" the segment, thereby avoiding the need to tear down and rebuild the MMU and virtual memory mappings and Exported and Imported Segment Table entries for old and new segments.

Figure 15A:
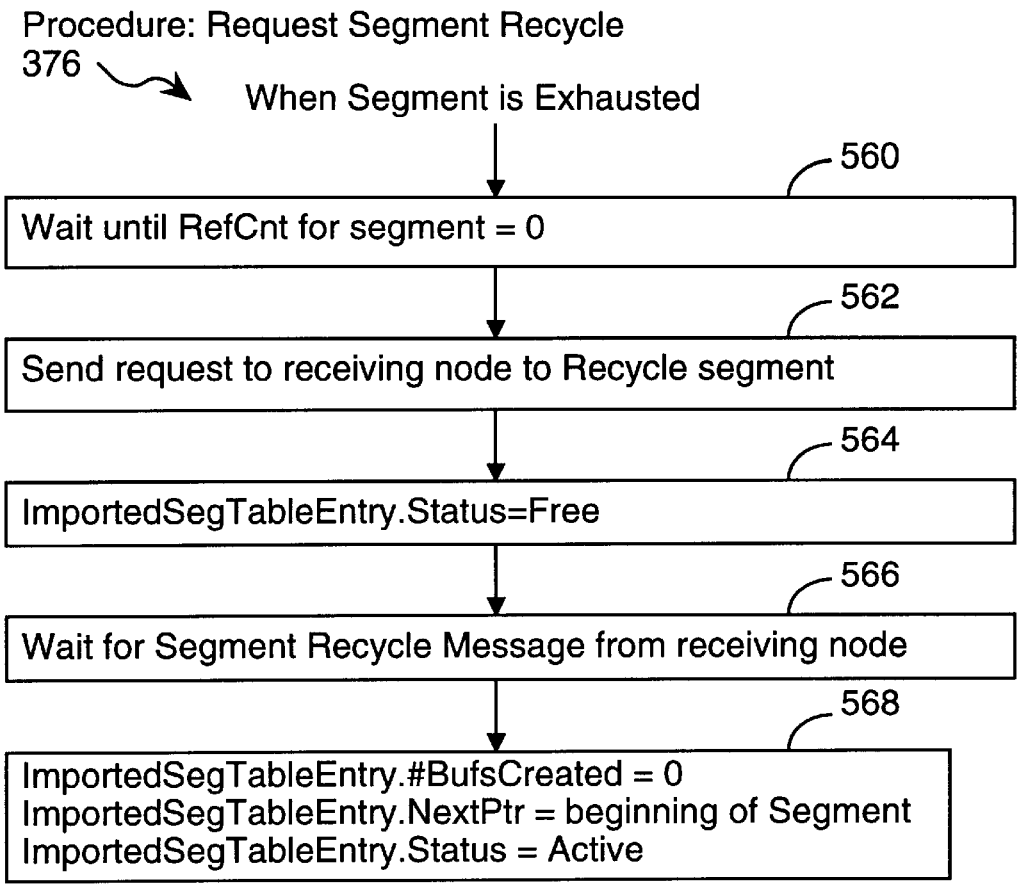
FIG. 15A is a flow chart of a "recycle segment request" procedure used by a sending computer in a preferred embodiment of the present invention.

Referring to FIG. 15A, when a segment has been exhausted by a sending node, the sending node can execute the Request Segment Recycle procedure 376, which initiates the process of enabling reuse of the segment. The procedure begins by waiting until the RefCnt for the segment is equal to zero (step 560), which indicates that the sending node has finished working with all the receive buffers allocated from the segment. Then it sends a Segment Recycle request message to the receiving node (step 562). The data portion of the Segment Recycle request message is the same as that shown in FIG. 12B for the Segment Release request message; only the opcode for the Segment Recycle request message differs from that of the Segment Release request message.

After sending the Segment Recycle request message the procedure sets the Status of the segment to Free (step 564), which indicates the segment is unavailable for use by the sending node until the receiving system finishes processing all message data in the segment and returns a recycle message.

The procedure then waits to receive a Segment Recycle Message from the receiving system (step 566) and, upon receipt of that message, it reinitializes the segment (step 568) by setting (in the Imported Segment Table entry for the segment) the segment's #BufsCreated to zero, the NextPtr to point to the beginning of the segment, and the Status to Active. Once the Status is set to active, the segment become available for use by message sending procedures in the sending node.

Figure 15B:
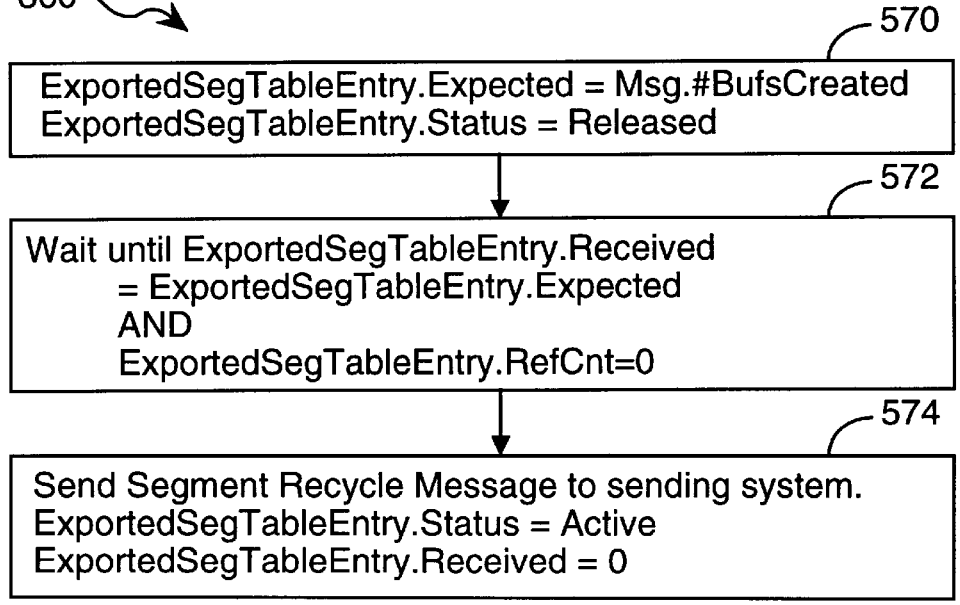
FIG. 15B is a flow chart of a "process recycle segment request" procedure used by a receiving computer in a preferred embodiment of the present invention.

Referring to FIG. 15B, the receiving node procedure 358 for processing a Segment Recycle request is executed in response to the receipt of a Segment Recycle request message. The procedure begins by setting the Expected field of the Exported Segment Table entry for the specified segment to the #BufsCreated value in the received message, and setting the Status field of the Exported Segment Table entry to a value of Released (step 570). Then the procedure waits until (A) the Received count field in the Exported Segment Table entry equals the Expected field, and (B) the RefCnt equals zero (step 572). These two conditions are met when the receiving node has finished processing all the messages in the receive buffers in the segment to be released, or has at least moved them to other locations for continued processing. Then the procedure sends a Segment Recycle message to the sending system and reinitializes the segment (step 574) by setting (in the Exported Segment Table entry for the segment) the segment's Status to Active and setting the Received count to zero.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of allocating buffer memory and sending a message from a first computer to a second computer, comprising the steps of:

at the first computer:
  requesting the second computer to allocate and export to the first node a set of memory segments, each having a respective specified size that is sufficient to hold a multiplicity of message buffers within a predefined size range;
  importing the memory segments exported by the second computer;
  allocating message buffers within the imported memory segments independently of the second computer; and
  sending messages to the second computer, including for each message (long message) having a data portion greater than a predefined minimum length performing the steps of: remotely writing the message's data portion into at least one of the allocated message buffers and sending the second computer a corresponding control message that indicates the location of the at least one message buffer in which the message's data portion was written.

2. The method of claim 1,
at the first computer:
  maintaining an Imported Segment data structure for keeping track of each segment imported by the first computer from the second computer, including storing location information about a respective unused portion, if any, of each imported segment;
  the message sending step including the message buffer allocating step, the message buffer allocating step including allocating at least one message buffer for each long message from the unused portion of at least one of the imported segments and updating the corresponding location information stored in the Imported Segment data structure to indicate a new location of any remaining portion of each imported segment from which a message buffer was allocated.

3. The method of claim 2,
at the first computer:
  determining when any of the imported memory segments has been exhausted, and for each exhausted memory segment performing the steps of: storing an indicia in the Imported Segment data structure to indicate that the exhausted memory segment in unavailable for use, sending a segment recycle request message to the second computer to request recycling of the exhausted memory segment, waiting for a segment recycle message from the second computer, and then storing information in the Imported Segment data structure to enable reuse of the exhausted memory segment; and
at the second computer:
  upon receiving the segment recycle request message for a specified memory segment, waiting until all messages sent by the first computer using buffers in the specified memory segment have been processed and then sending the segment recycle message for the specified memory segment to the first computer.

4. A method of allocating buffer memory and sending a message from a first computer to a second computer, comprising the steps of:
  at the second computer, allocating memory segments in the second computer, at least a subset of the allocated memory segments each having a respective specified size that is sufficient to hold a multiplicity of message buffers within a predefined size range, and exporting the allocated memory segment to the first computer;
  at the first computer:
    importing the memory segments exported by the second computer;
    allocating message buffers within the imported memory segments independently of the second computer;
    sending messages to the second computer, including for each message (long message) having a data portion greater than a predefined minimum length performing the steps of: remotely writing the message's data portion into at least one of the allocated message buffers and sending the second computer a corresponding control message that indicates the location of the at least one message buffer in which the message's data portion was written; and
  at the second computer, processing the messages sent by the first computer, including processing the control message corresponding to each long message sent by the first computer to determine the location of the at least one message buffer in which the long message's data portion was written and processing the data in the at least one message buffer;
  whereby the first computer remotely allocates message buffers within memory segments in the second computer independently of the second computer and sends long messages to the second computer using the remotely allocated message buffers.

5. The method of claim 4,
at the first computer:
  maintaining an Imported Segment data structure for keeping track of each segment imported by the first computer from the second computer, including storing location information about a respective unused portion, if any, of each imported segment;
  the message sending step including the message buffer allocating step, the message buffer allocating step including allocating at least one message buffer for each long message from the unused portion of at least one of the imported segments and updating the corresponding location information stored in the Imported Segment data structure to indicate a new location of any remaining portion of each imported segment from which a message buffer was allocated.

6. The method of claim 5,
at the first computer:
  determining when any of the imported memory segments has been exhausted, and for each exhausted memory segment performing the steps of: storing an indicia in the Imported Segment data structure to indicate that the exhausted memory segment in unavailable for use, sending a segment recycle request message to the second computer to request recycling of the exhausted memory segment, waiting for a segment recycle message from the second computer, and then storing information in the Imported Segment data structure to enable reuse of the exhausted memory segment; and
at the second computer:
  upon receiving the segment recycle request message for a specified memory segment, waiting until all messages sent by the first computer using buffers in the specified memory segment have been processed and then sending the segment recycle message for the specified memory segment to the first computer.

7. The method of claim 6,
at the first computer:
  determining when any of the imported memory segments has been exhausted, and for each exhausted memory segment performing the steps of: storing an indicia in the Imported Segment data structure to indicate that the exhausted memory segment in unavailable for use, sending a segment release request message to the second computer to request release of the exhausted memory segment, and unimporting the exhausted memory segment; and at the second computer:
  upon receiving the segment release request message for a specified memory segment, waiting until all messages sent by the first computer using buffers in the specified memory segment have been processed and then unexporting and deallocating the specified memory segment.

8. In a distributed computer system, apparatus for remotely writing messages from a first computer to a second computer, comprising:

at the first computer:
  a CPU;
  a network interface for transmitting and receiving messages;
  a memory segment importing procedure, executed by the first computer's CPU, for importing memory segments exported by the second computer;
    a message sending procedure, executed by the first computer's CPU, for sending messages to the second computer, including instructions for sending long messages having a data portion greater than a predefined minimum length, the long message sending instructions for sending each long message including instructions for:
      allocating at least one message buffer within the imported memory segments, independently of the second computer; and
      remotely writing the message's data portion into the at least one allocated message buffer and sending the second computer a corresponding control message that indicates the location of the at least one message buffer in which the message's data portion was written.

9. The apparatus of claim 8, further including:
at the first computer:
  the message segment importing procedure and the message sending procedure including instructions for maintaining an Imported Segment data structure for keeping track of each segment imported by the first computer from the second computer, including storing location information about a respective unused portion, if any, of each imported segment;
  the message sending procedure including instructions for allocating at least one message buffer for each long message from the unused portion of at least one of the imported segments and updating the corresponding location information stored in the Imported Segment data structure to indicate a new location of any remaining portion of each imported segment from which a message buffer was allocated.

10. The apparatus of claim 8, further including:
at the second computer:
  a CPU;
  a network interface for transmitting and receiving messages;
  a memory segment creation procedure, executed by the second computer's CPU, for allocating memory segments in the second computer, at least a subset of the allocated memory segments each having a respective specified size that is sufficient to hold a multiplicity of message buffers within a predefined size range, and for exporting the allocated memory segment to the first computer; and
  a receive message procedure, executed by the second computer's CPU, for processing each message received from the first computer and for remotely writing, via the network interface, an acknowledgment message in a corresponding memory location in the first computer.

11. The apparatus of claim 10, further including:
at the first computer:
  the message segment importing procedure and the message sending procedure including instructions for maintaining an Imported Segment data structure for keeping track of each segment imported by the first computer from the second computer, including storing location information about a respective unused portion, if any, of each imported segment;
  the message sending procedure including instructions for allocating at least one message buffer for each long message from the unused portion of at least one of the imported segments and updating the corresponding location information stored in the Imported Segment data structure to indicate a new location of any remaining portion of each imported segment from which a message buffer was allocated;
  the message sending procedure including instructions for determining when any of the imported memory segments has been exhausted, and for each exhausted memory segment performing the steps of: storing an indicia in the Imported Segment data structure to indicate that the exhausted memory segment in unavailable for use, sending a segment recycle request message to the second computer to request recycling of the exhausted memory segment, waiting for a segment recycle message from the second computer, and then storing information in the Imported Segment data structure to enable reuse of the exhausted memory segment; and at the second computer:
  a segment recycle procedure, executed by the second computer's CPU, for receiving the segment recycle request message for a specified memory segment, waiting until all messages sent by the first computer using buffers in the specified memory segment have been processed and then sending the segment recycle message for the specified memory segment to the first computer.

12. The apparatus of claim 10, further including:
at the first computer:
  the message segment importing procedure and the message sending procedure including instructions for maintaining an Imported Segment data structure for keeping track of each segment imported by the first computer from the second computer, including storing location information about a respective unused portion, if any, of each imported segment;
  the message sending procedure including instructions for allocating at least one message buffer for each long message from the unused portion of at least one of the imported segments and updating the corresponding location information stored in the Imported Segment data structure to indicate a new location of any remaining portion of each imported segment from which a message buffer was allocated;
  the message sending procedure including instructions for determining when any of the imported memory segments has been exhausted, and for each exhausted memory segment performing the steps of: storing an indicia in the Imported Segment data structure to indicate that the exhausted memory segment in unavailable for use, sending a segment release request message to the second computer to request release of the exhausted memory segment, and unimporting the exhausted memory segment; and at the second computer:

a segment release procedure, executed by the second computer's CPU, for receiving the segment release request message for a specified memory segment, waiting until all messages sent by the first computer using buffers in the specified memory segment have been processed and then unexporting and deallocating the specified memory segment.

* * * * *